(12) United States Patent
Lo

(10) Patent No.: US 6,993,667 B1
(45) Date of Patent: Jan. 31, 2006

(54) APPARATUS FOR AUTOMATIC ENERGY SAVINGS MODE FOR ETHERNET TRANSCEIVERS AND METHOD THEREOF

(75) Inventor: William Lo, Cupertino, CA (US)

(73) Assignee: Marvell International Ltd., Hamilton (BM)

( * ) Notice: Subject to any disclaimer, the term of this patent is extended or adjusted under 35 U.S.C. 154(b) by 637 days.

(21) Appl. No.: 09/990,137

(22) Filed: Nov. 21, 2001

Related U.S. Application Data

(60) Provisional application No. 60/256,117, filed on Dec. 15, 2000.

(51) Int. Cl.
G06F 1/32 (2006.01)

(52) U.S. Cl. ............ 713/320; 713/300; 713/310; 713/320; 713/322; 713/324; 370/287; 370/318; 370/433; 370/463

(58) Field of Classification Search ........ 713/300, 713/310, 320, 323, 330, 322, 324; 370/287, 370/318, 463, 433
See application file for complete search history.

(56) References Cited

U.S. PATENT DOCUMENTS

| | | | |
|---|---|---|---|
| 5,404,544 A | 4/1995 | Crayford | |
| 5,610,903 A * | 3/1997 | Crayford | 370/213 |
| 5,742,833 A | 4/1998 | Dea et al. | |
| 5,884,041 A | 3/1999 | Hurwitz | |
| 5,907,553 A * | 5/1999 | Kelly et al. | 370/433 |
| 5,922,052 A * | 7/1999 | Heaton | 709/223 |
| 6,026,494 A | 2/2000 | Foster | |
| 6,169,475 B1 * | 1/2001 | Browning | 340/286.02 |
| 6,215,764 B1 * | 4/2001 | Wey et al. | 370/216 |
| 6,442,142 B1 * | 8/2002 | Bar-Niv | 370/252 |
| 6,622,178 B1 * | 9/2003 | Burke et al. | 710/15 |
| 6,795,450 B1 * | 9/2004 | Mills et al. | 370/463 |
| 6,883,025 B2 * | 4/2005 | Andra et al. | 709/220 |
| 2004/0066301 A1 * | 4/2004 | Browning | 340/657 |

OTHER PUBLICATIONS

IEEE, Std 802.3, 2000 Edition, Local and Metropolitan Area Networks, Section 40.4.4 - 40.4.6.

* cited by examiner

Primary Examiner—Lynne H. Browne
Assistant Examiner—Nitin C. Patel

(57) ABSTRACT

An energy saving circuit is connected to a receiver of a first physical layer of a first network device. The energy saving device has first and second energy saving modes. In the first energy saving mode, a sense circuit generates a receive signal when connection activity is detected by the receiver. The energy saving circuit powers down the physical layer when the receiver does not detect the connection activity. An autonegotiation circuit powers up the first physical layer and negotiates a connection with a second physical layer of a second network device when the sense circuit generates the receive signal. In a second energy saving mode, a second timer periodically powers a transmitter and generates a link pulse. After the transmitter generates the link pulse, the transmitter is turned off.

36 Claims, 7 Drawing Sheets

APPARATUS FOR AUTOMATIC ENERGY SAVINGS MODE FOR ETHERNET TRANSCEIVERS AND METHOD THEREOF

CROSS-REFERENCE TO RELATED APPLICATIONS

This application claims the benefit of U.S. Provisional Application Ser. No. 60/256,117 that was filed on Dec. 15, 2000, which is hereby incorporated by reference.

FIELD OF THE INVENTION

The present invention relates to network devices, and more particularly to energy saving circuits that are associated with the physical layer of network devices.

BACKGROUND OF THE INVENTION

Servers, storage devices, computers, printers, switches and other electronic devices are often connected together to form a network to allow the exchange of data. The network devices include a physical layer that usually includes network cards and cables that establish and maintain the connection between the network devices. In 10BASE-T, 100 BASE-TX, and 1000BASE-T networks, the physical layer executes autonegotiation protocols that initiate the data link between the network devices. Once the data link is lost, the physical layer notifies the network device. The cable usually provides the physical connection between the physical layers of network devices.

During autonegotiation, bursts of pulses called fast link pulse (FLP) bursts are transmitted and received periodically by the physical layer. The purpose of the FLP bursts is to detect the presence of another network device and to initiate the exchange of data between the network devices. The initialization information typically includes configuration information such as the communication speed(s) that are available and other information that will be necessary for subsequent communications between the network devices.

When a physical layer of a network device is not connected to another network device, the physical layer still periodically transmits FLP bursts in an attempt to initiate connections to other network devices. FLP bursts usually include 17 to 33 link pulses that are generated every 16 ms. The physical layer remains powered up while attempting to connect to another network device.

Laptop computers are sensitive to the use of power due to the limited power that is available from the batteries. Continuously powering the physical layer when the laptop computer is not already connected to another network device is not an efficient use of the laptop computer's battery power. One way to reduce power consumption is for the laptop computer to completely power down the physical layer when the laptop computer is not connected to another network device. However, if another network device is attempting to establish a data link with the laptop computer, there is no way for the powered-down physical layer to detect the presence of the other network device. Even when the network device is not battery powered, reducing power consumption reduces heat that is generated by the network device.

SUMMARY OF THE INVENTION

An energy saving circuit according to the present invention is connected to a receiver of a first physical layer of a first network device. The energy saving device includes a sense circuit that is connected to the receiver. The sense circuit generates a receive signal when connection activity is detected by the receiver. The energy saving circuit powers down the physical layer when the receiver does not detect connection activity.

In other features of the invention, an autonegotiation circuit is connected to the sense circuit. The autonegotiation circuit powers up the first physical layer and attempts to negotiate a connection with a second physical layer of a second network device when the sense circuit generates the receive signal.

According to other features of the invention, the sense circuit enters a sense state and powers down the physical layer when the sense circuit is reset. The autonegotiation circuit enters into an autonegotiation state when the receive signal is generated by the sense circuit. The autonegotiation circuit includes a first timer that generates a first signal after a first period. The first timer is reset whenever the receive signal is received from the sense circuit. The first signal resets the sense circuit.

In other features, a link circuit is connected to the autonegotiation circuit and triggers a link state when autonegotiation is successful and a data link is established with the second physical layer. The link circuit generates a link lost signal when the data link is lost. If the first timer times out before autonegotiation is completed, the sense circuit powers down the first physical layer and returns to the sense state.

In yet other features, the sense circuit includes a second timer that is connected to a transmitter. When the second timer times out, the transmitter is turned on and generates a pulse. After the transmitter generates the pulse, the transmitter is turned off and the sense circuit returns to the sense state.

In still other features, the energy saving circuit has a connection configuration and further includes a switching circuit that senses a connection configuration of the second physical layer. The switching circuit matches the connection configuration of the first physical layer with the connection configuration of the second physical layer.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

The following description of the preferred embodiment(s) is merely exemplary in nature and is in no way intended to limit the invention, its application, or uses.

Figure 1:
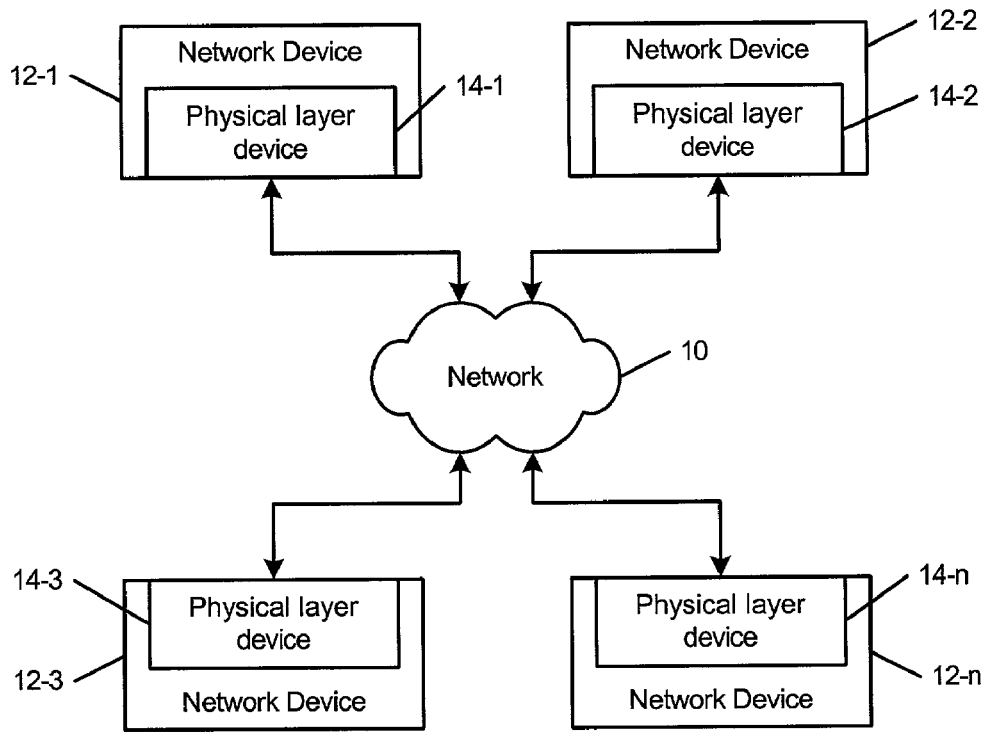
FIG. 1 illustrates a plurality of network devices according to the prior art that include physical layers.

Referring now to FIG. 1, a network 10 according to the prior art is connected to a plurality of network devices 12-1, 12-2, ..., and 12-n. Each of the network devices 12-1, 12-2, ..., and 12-n includes a physical layer 14-1, 14-2, ..., and 14-n, respectively, that is responsible for establishing and maintaining a communications link between the communicating network devices 12. In situations where a single network device, such as network device 12-1, is not connected to any other network devices, the network device 12-1 provides power to the physical layer 14-1 even though it is not presently communicating with any other network devices 12.

Figure 2:
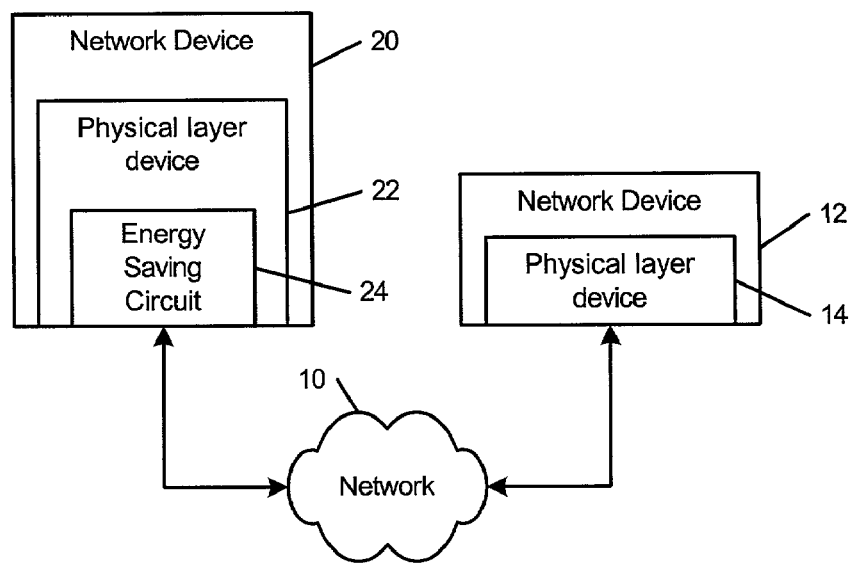
FIG. 2 illustrates a network device according to the present invention including a physical layer with an energy saving circuit.

Referring now to FIG. 2, a network device 20 according to the present invention includes a physical layer 22 and an energy saving circuit 24. The energy saving circuit 24 can be implemented as a digital circuit, an analog circuit, a processor and software, an application specific integrated circuit (ASIC) or any other suitable circuit. In situations where the network device 20 is not connected to any other network devices, the energy saving circuit 24 reduces power consumption of the physical layer 22 as will be described more fully below.

Figure 3:
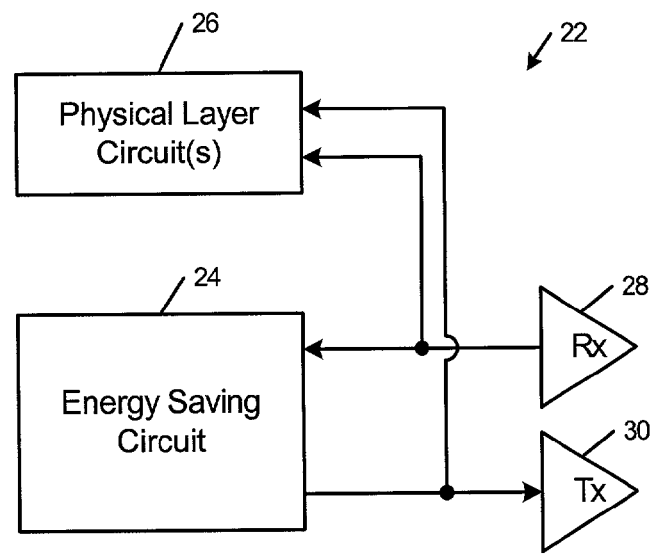
FIG. 3 illustrates the energy saving circuit, other physical layer circuits, a receiver and a transmitter.
Figure 4:
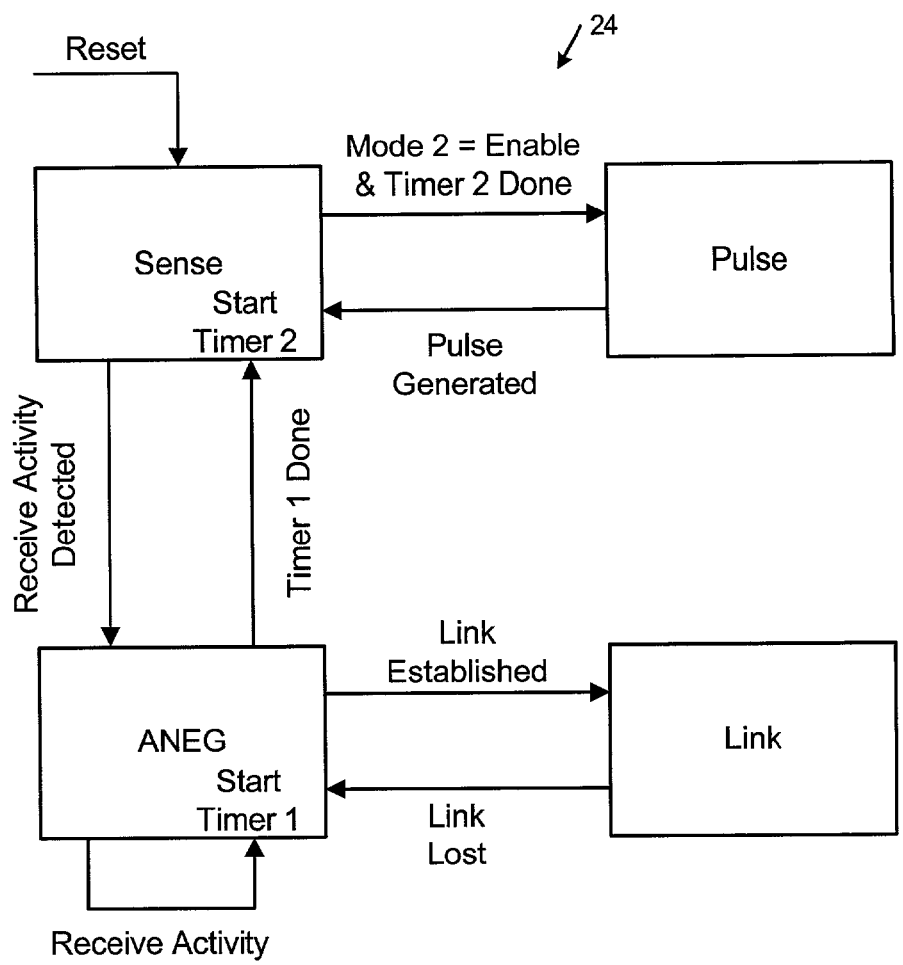
FIG. 4 illustrates the operation of the energy saving circuit of FIG. 2 in further detail.
Figure 5:
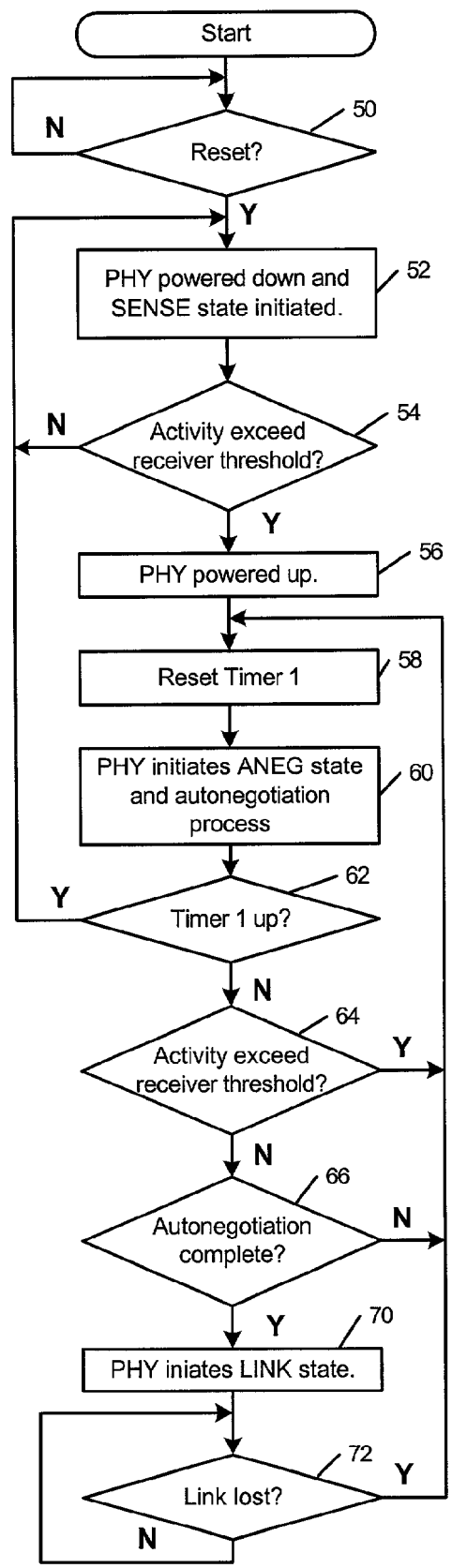
FIG. 5 is a flowchart illustrating steps that are performed in a first energy saving mode.

Referring now to FIGS. 3, 4 and 5, the energy saving circuit 24 is connected to one or more physical layer circuits 26, a receiver 28 and a transmitter 30. The physical layer circuits 26 perform conventional functions of the physical layer other than the energy saving modes of the present invention. The energy saving circuit 24 enters a SENSE state when reset (steps 50 and 52). In the SENSE state, the physical layer 22 is powered down (step 52) except for the energy saving circuit 24 and the receiver 28. The receiver 28 is preferably an Ethernet receiver such as a 10BASE-T receiver that draws very little power.

When connection activity exceeding a receiver threshold that is set by the receiver 28 or the sense circuit is detected (step 54), the energy saving circuit 24 moves into an ANEG state. In the ANEG state, the physical layer 22 is powered up (step 56) and a first timer (TIMER 1) is started (step 58). During autonegotiation, the physical layer 22 attempts to establish a connection (step 60) with other network devices 12. The first timer TIMER1 times out after a first predetermined period unless reset (step 62). While in the ANEG state, the first timer TIMER1 is reset every time additional connection activity exceeding the receiver threshold is detected by the receiver 28 (step 64).

If the connection activity that was detected by the receiver 28 was a noise hit and there are no active network devices 12 that are connected to the network device 20, the first timer TIMER1 will eventually time out. In a preferred embodiment, the first predetermined period of the first timer TIMER1 is set to approximately 1–5 seconds. When the first timer TIMER1 times out, the energy saving circuit 24 returns to the SENSE state (step 52). If there is an active network device 12 attempting to establish communications, autonegotiation will complete (step 66) and the energy saving circuit 24 will enter a LINK state (step 70). In the LINK state, the physical layer 22 is powered up and operates normally.

If the physical layer 22 loses the connection (step 72), the physical layer 22 will move from the LINK state to the ANEG state and try to re-establish the connection (step 58). This method of control allows the physical layer 22 to automatically power up and down based on whether connection activity is present. As can be appreciated, energy is saved by powering down the physical layer 22 as described above.

Figure 6:
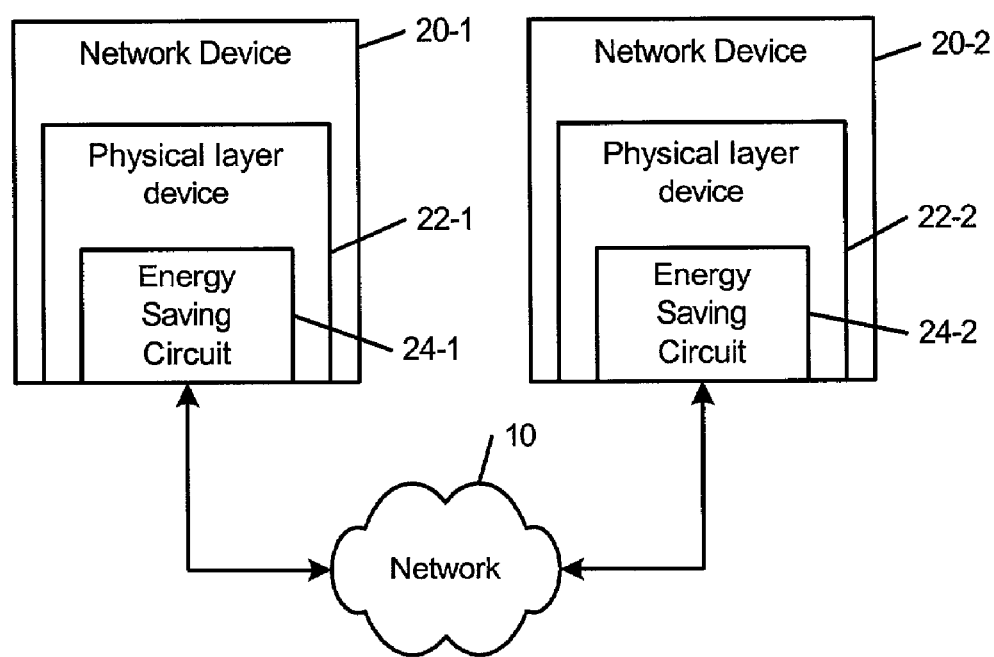
FIG. 6 illustrates two network devices according to the present invention that are connected to a network.
Figure 7:
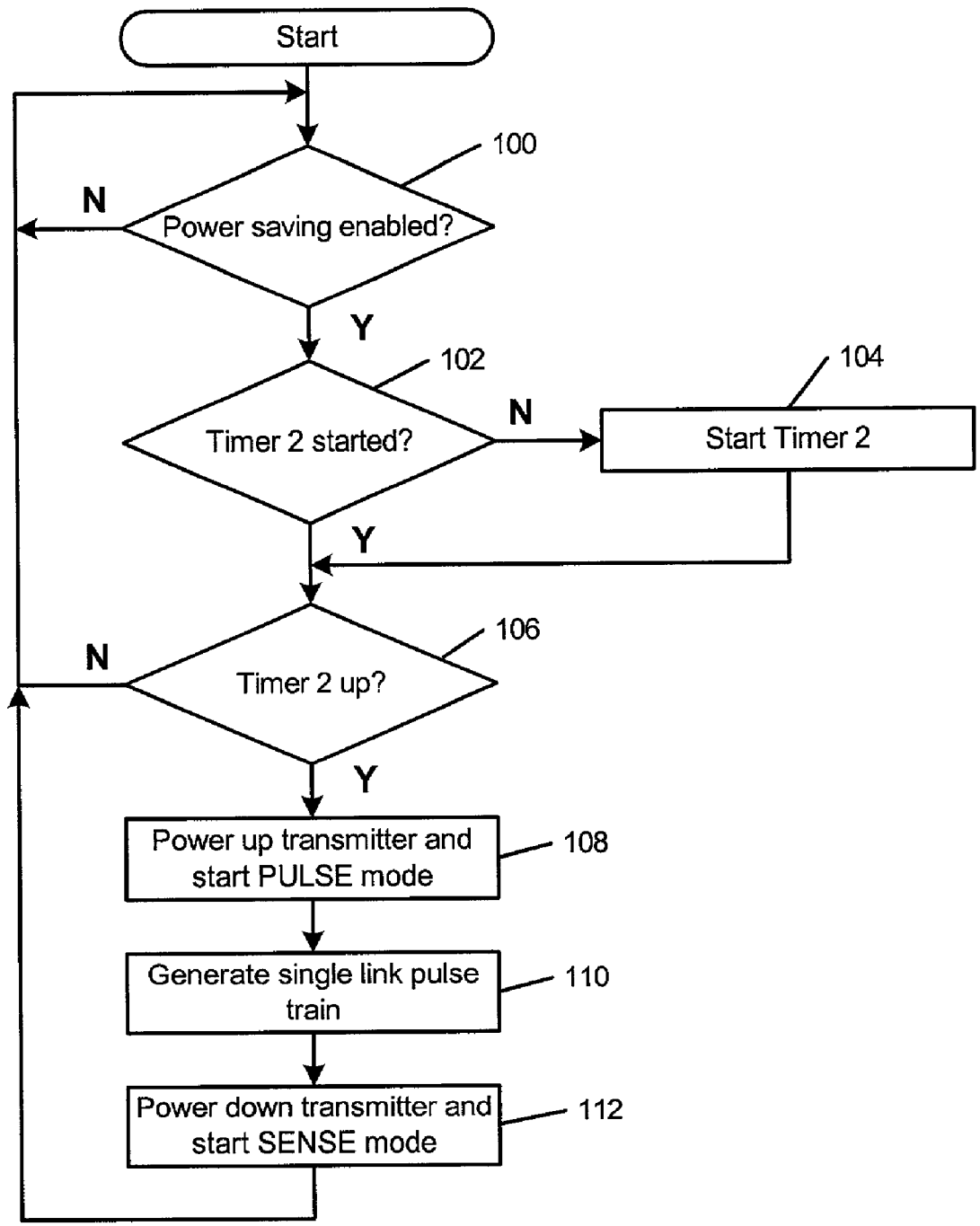
FIG. 7 is a flowchart illustrating steps that are performed in a second energy saving mode.

Referring to FIGS. 6 and 7, a second energy saving mode of the energy saving circuit 24-1 of FIG. 2 is shown. In the second energy saving mode, the physical layer 22-1 periodically transmits a single link pulse. A physical layer 22-1 with the second energy saving mode enabled can detect a link pulse from another physical layer 22-2 that has the second energy saving mode enabled.

The second power saving mode is initially enabled (step 100). A second timer TIMER2 is started (steps 102 and 104). The second timer TIMER2 times out after a second predetermined period. If the second energy saving mode is enabled and the second timer TIMER2 times out (step 106), the energy saving circuit 24 moves into the PULSE state (step 108). In the PULSE state, the transmitter 30 is powered on and a link pulse is generated. Preferably a single link pulse is generated (step 110). After the single link pulse is generated, the energy saving circuit 24 returns to the SENSE state and the transmitter is shut down (step 112).

More power is consumed in the second energy saving mode than in the first energy saving mode because the transmitter link pulses are generated periodically. However, the link pulse transmission is preferably much less frequent than FLP bursts that are generated every 16 ms and that typically include 17 to 33 link pulses. For example, in the second energy saving mode a single link pulse can be generated once per second or at other intervals.

Figure 8:
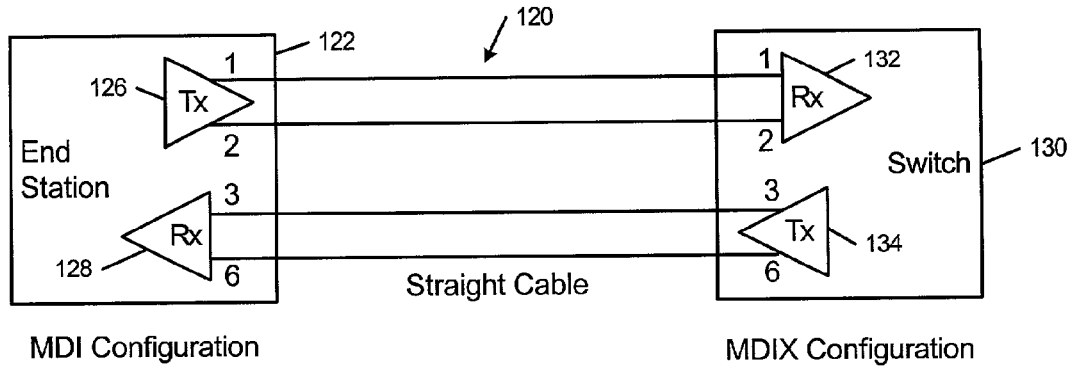
FIG. 8 illustrates the interconnection between a MDIX configuration switch and a MDI configuration end station.
Figure 9:
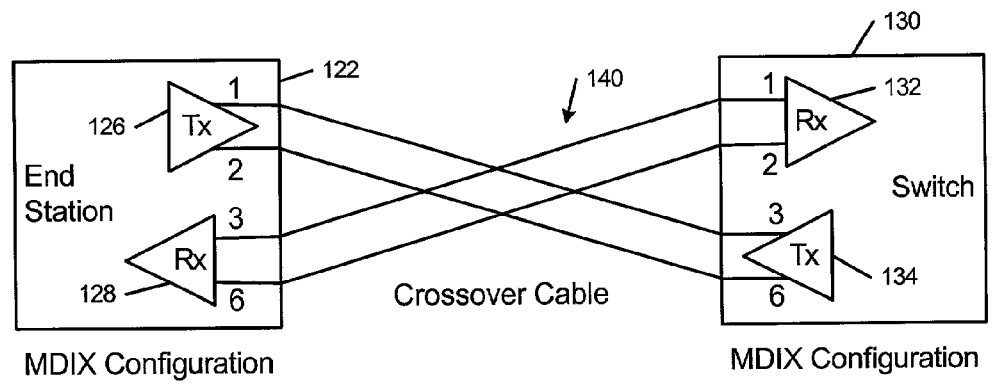
FIG. 9 illustrates a crossover interconnection between a MDIX configuration end station and a MDIX configuration switch.
Figure 10:
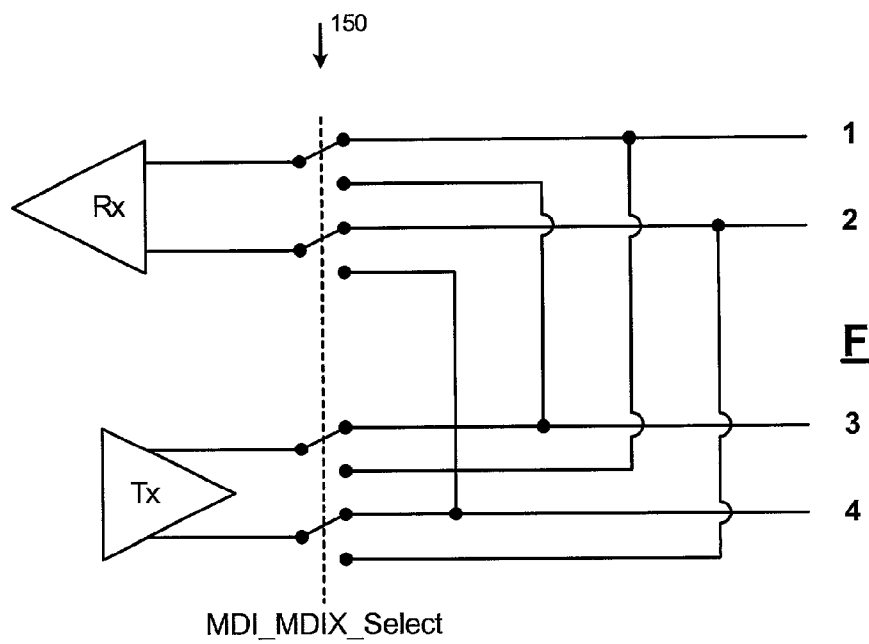
FIG. 10 illustrates a crossover interconnection selector that may be implemented in a physical layer.

Some physical layers implement crossover functions. The first and second energy saving modes can be modified to work in conjunction with these crossover functions. FIG. 8 shows the connection of transmit and receive pairs using an RJ-45 connector 120. In a MDI configuration, an end station 122 is configured with pins 1 and 2 as a transmitter 126 and pins 3 and 6 as a receiver 128. A switch 130 is configured with pins 1 and 2 as a receiver 132 and pins 3 and 6 as a transmitter 134. A connection between the switch 130 and the end station 122 requires the connector 120 that provides a straight cable connection. However, the two switches in FIG. 9 require a connection 140 that provides a crossover. Some physical layers employ a crossover interconnection selector inside of the physical layer as shown in FIG. 10. Depending on the cable that is used, the physical layer automatically detects and selects the correct pins to use by toggling switches 150. The crossover function is defined more fully in IEEE 802.3, which is hereby incorporated by reference. In particular, Section 40.4.4–40.4.6 of IEEE 802.3 address the crossover capability.

Figure 11:
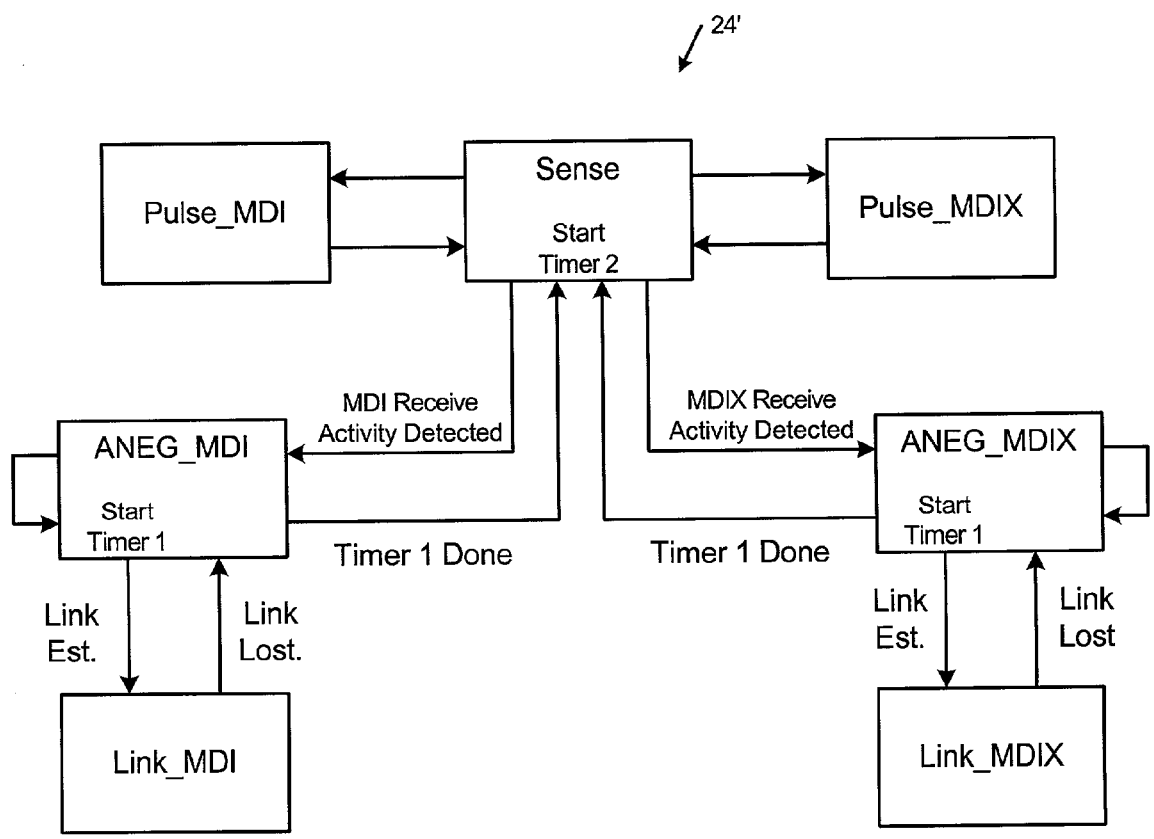
FIG. 11 illustrates an embodiment of an energy saving scheme with crossover capability.

Referring now to FIG. 11, an energy saving circuit 24' with crossover capability is illustrated. The energy saving circuit 24' is able to distinguish the source of the connection activity. In other words the energy saving circuit 24' determines whether the connection activity is transmitted by the MDI receiver (pins 3 and 6) or by the MDIX receiver (pins 1 and 2). The energy saving circuit 24' is operated in a manner that is similar to the energy saving circuit 24 that is illustrated in FIG. 4. However, the ANEG_MDI state or the ANEG_MDIX state are selected depending on the source of the connection activity. In the case of ANEG_MDI and LINK_MDI, the physical layer 22' operates in the MDI configuration. In the case of ANEG_MDIX and LINK_MDIX, the physical layer 22' operates in the MDIX configuration.

In the second energy savings mode, the physical layer 22' randomly selects the MDI or MDIX configuration and transmits the link pulse on the appropriate ports. If the MDI configuration is selected, the energy saving circuit 24' enters a PULSE_MDI state and generates a link pulse on the MDI transmitter (pins 1, 2). If the MDIX configuration is selected, the energy saving circuit 24' enters a PULSE_MDIX state and generates a link pulse on the MDIX transmitter (pins 1, 2). If two devices implement the auto crossover function and the second energy saving mode, the random generation of link pulses in the MDI and MDIX configurations will eventually allow each device to recognize the activity of the other device.

Preferably an interrupt signal is generated whenever the physical layer 22' transitions between the SENSE and ANEG states. The interrupt signal is used to shut down additional circuitry, such as an Ethernet controller, while the physical layer 22' is in the SENSE state. Shutting down the additional circuitry permits the energy saving circuit 24' to save additional power. Once the physical layer 22' goes into the ANEG state, the interrupt signal is generated to let the energy saving circuit 24' know that it needs to power up. Similarly, when the physical layer 22' transitions from the ANEG state to the SENSE state, an interrupt signal is generated to let the physical layer 22' know that it should power down.

Thus it will be appreciated from the above, the present invention discloses an energy saving circuit and method for providing energy savings for Ethernet transceivers. It will be equally apparent and is contemplated that modification and/or changes may be made in the illustrated embodiment without departure from the invention. Accordingly, it is expressly intended that the foregoing description and accompanying drawings are illustrative of preferred embodiments only, not limiting, and that the true spirit and scope of the present invention will be determined by reference to the appended claims and their legal equivalent.

What is claimed is:

1. An energy saving circuit that communicates with a receiver of a first physical layer of a first network device, comprising:
    a sense circuit that communicates with said receiver and that generates a receive signal when connection activity that exceeds a first threshold is detected by said receiver, wherein said sense circuit enters a sense state and powers down said first physical layer when said sense circuit is reset,
    wherein said energy saving circuit powers down said first physical layer when said receiver does not detect said connection activity for a first predetermined period to reduce power consumption of said first physical layer;
    an autonegotiation circuit that communicates with said sense circuit and that powers up said first physical layer and attempts to negotiate a connection with a second physical layer of a second network device when said sense circuit generates said receive signal; and
    a first timer that generates a first signal after a first period and that is reset when said receive signal is generated by said sense circuit,
    wherein if said first timer times out before autonegotiation is complete, said sense circuit powers down said first physical layer and returns to said sense state.

2. The energy saving circuit of claim 1 further comprising a link circuit that triggers a link state when autonegotiation is complete and a link with said second physical layer is established.

3. The energy saving circuit of claim 2 wherein said link circuit generates a link lost signal when said link is lost.

4. The energy saving circuit of claim 1 further comprising a status indicator that generates a status signal to notify said first network device of a power status of said first physical layer.

5. An energy saving circuit that communicates with a receiver of a first physical layer of a first network device, comprising:
    a sense circuit that communicates with said receiver and that generates a receive signal when connection activity that exceeds a first threshold is detected by said receiver, wherein said sense circuit enters a sense state and powers down said first physical layer when said sense circuit is reset, and
    wherein said energy saving circuit powers down said first physical layer when said receiver does not detect said connection activity for a first predetermined period to reduce power consumption of said first physical layer; and
    an autonegotiation circuit that communicates with said sense circuit and that powers up said first physical layer and attempts to negotiate a connection with a second physical layer of a second network device when said sense circuit generates said receive signal, and wherein said sense circuit includes timer that communicates with a transmitter and that is reset when said receive signal is generated by said sense circuit.

6. The energy saving circuit of claim 5 wherein when said timer times out, said transmitter is turned on and generates a pulse.

7. The energy saving circuit of claim 6 wherein after said transmitter generates said pulse, said transmitter is turned off and said sense circuit returns to said sense state.

8. The energy saving circuit of claim 7 wherein said timer has a second period that is longer than a period of fast link pulse bursts.

9. An energy saving circuit that communicates with a receiver of a first physical layer of a first network device, comprising:
    a sense circuit that communicates with said receiver and that generates a receive signal when connection activity that exceeds a first threshold is detected by said receiver,
    wherein said energy saving circuit powers down said first physical layer when said receiver does not detect said connection activity for a first predetermined period to reduce power consumption of said first physical layer; and
    a switching circuit that senses an MDI/MDIX connection configuration of a second physical layer and that adjusts an MDI/MDIX connection configuration of said first physical layer to match said MDI/MDIX connection configuration of said second physical layer.

10. An energy saving circuit that communicates with a receiver of a first physical layer of a first network device, comprising:

sensing means for communicating with said receiver and for generating a receive signal when connection activity that exceeds a first threshold is detected by said receiver, wherein said sensing means enters a sense state and powers down said first physical layer when said sensing means is reset, wherein said energy saving circuit powers down said first physical layer when said receiver does not detect said connection activity for a first predetermined period to reduce power consumption of said first physical layer;

autonegotiation means for communicating with said sense circuit and for powering up said first physical layer and attempting to negotiate a connection with a second physical layer of a second network device when said sensing means generates said receive signal; and first timing means for generating a first signal after a first period, wherein said first timing means is reset when said receive signal is generated by said sensing means, wherein if said first timing means times out before autonegotiation is complete, said sensing means powers down said first physical layer and returns to said sense state.

11. The energy saving circuit of claim 10 further comprising link means for triggering a link state when autonegotiation is complete and a link with said second physical layer is established.

12. The energy saving circuit of claim 11 wherein said link means generates a link lost signal when said link is lost.

13. The energy saving circuit of claim 10 further comprising status indicator means for generating a status signal to notify said first network device of a power status of said first physical layer.

14. An energy saving circuit that communicates with a receiver of a first physical layer of a first network device, comprising:

sensing means for communicating with said receiver and for generating a receive signal when connection activity that exceeds a first threshold is detected by said receiver, wherein said sensing means enters a sense state and powers down said first physical layer when said sensing means is reset, wherein said energy saving circuit powers down said first physical layer when said receiver does not detect said connection activity for a first predetermined period to reduce power consumption of said first physical layer;

autonegotiation means for communicating with said sense circuit and for powering up said first physical layer and attempting to negotiate a connection with a second physical layer of a second network device when said sensing means generates said receive signal; and timing means for communicating with a transmitter and that is reset when said receive signal is generated by said sensing means.

15. The energy saving circuit of claim 14 wherein when said timing means times out, said transmitter is turned on and generates a pulse.

16. The energy saving circuit of claim 15 wherein after said transmitter generates said pulse, said transmitter is turned off and said sensing means returns to said sense state.

17. The energy saving circuit of claim 16 wherein said timing means has a second period that is longer than a period of fast link pulse bursts.

18. An energy saving circuit that communicates with a receiver of a first physical layer of a first network device, comprising:

sensing means for communicating with said receiver and for generating a receive signal when connection activity that exceeds a first threshold is detected by said receiver;

wherein said energy saving circuit powers down said first physical layer when said receiver does not detect said connection activity for a first predetermined period to reduce power consumption of said first physical layer; and switching means for sensing an MDI/MDIX connection configuration of a second physical layer and for adjusting an MDI/MDIX connection configuration of said first physical layer to match said MDI/MDIX connection configuration of said second physical layer.

19. A method for saving energy in a first physical layer of a first network device, comprising:

generating a receive signal using a sense circuit when connection activity that exceeds a first threshold is detected by a receiver;

powering down said first physical layer when said receiver does not detect said connection activity for a first predetermined period to reduce power consumption of said first physical layer;

powering up said first physical layer and attempting to negotiate a connection with a second physical layer of a second network device using an autonegotiation circuit when said sense circuit generates said receive signal;

entering a sense state of said sense circuit;

powering down said first physical layer when said sense circuit is reset;

generating a first signal that resets said sense circuit after a first period using a first timer;

resetting said first timer when said receive signal is generated by said sense circuit;

powering down said first physical layer using said sense circuit if said first timer times out before autonegotiation is complete; and returning said sense circuit to said sense state.

20. The method of claim 19 further comprising triggering a link state when autonegotiation is complete and a link with said second physical layer is established.

21. The method of claim 20 further comprising generating a link lost signal when said link is lost.

22. The method of claim 19 further comprising generating a status signal to notify said first network device of a power status of said first physical layer.

23. A method for saving energy in a first physical layer of a first network device, comprising:

generating a receive signal using a sense circuit when connection activity that exceeds a first threshold is detected by a receiver;

powering down said first physical layer when said receiver does not detect said connection activity for a first predetermined period to reduce power consumption of said first physical layer;

powering up said first physical layer and attempting to negotiate a connection with a second physical layer of a second network device using an autonegotiation circuit when said sense circuit generates said receive signal;

entering a sense state of said sense circuit;

powering down said first physical layer when said sense circuit is reset, wherein said sense circuit includes a timer for communicating with a transmitter and that is reset when said receive signal is generated.

24. The method of claim 23 further comprising turning on said transmitter and generating a pulse when said timer times out.

25. The method of claim 24 further comprising turning off said transmitter and transitioning said sense circuit to said sense state after said transmitter generates said pulse.

26. The method of claim 25 wherein said timer has a second period that is longer than a period of fast link pulse bursts.

27. A method for saving energy in a first physical layer of a first network device, comprising:
generating a receive signal using a sense circuit when connection activity that exceeds a first threshold is detected by a receiver; and
powering down said first physical layer when said receiver does not detect said connection activity for a first predetermined period to reduce power consumption of said first physical layer;
powering up said first physical layer and attempting to negotiate a connection with a second physical layer of a second network device using an autonegotiation circuit when said sense circuit generates said receive signal;
sensing an MDI/MDIX connection configuration of said second physical layer; and
adjusting an MDI/MDIX connection configuration of said first physical layer to match said MDI/MDIX connection configuration of said second physical layer.

28. A software method for saving energy in a first physical layer of a first network device, comprising:
generating a receive signal using a sense circuit when connection activity that exceeds a first threshold is detected by a receiver;
powering down said first physical layer when said receiver does not detect said connection activity for a first predetermined period to reduce power consumption of said first physical layer;
powering up said first physical layer and attempting to negotiate a connection with a second physical layer of a second network device using an autonegotiation circuit when said sense circuit generates said receive signal;
entering a sense state of said sense circuit;
powering down said first physical layer when said sense circuit is reset;
generating a first signal that resets said sense circuit after a first period using a first timer;
resetting said first timer when said receive signal is generated by said sense circuit;
powering down said first physical layer using said sense circuit if said first timer times out before autonegotiation is complete; and
returning said sense circuit to said sense state.

29. The software method of claim 28 further comprising triggering a link state when autonegotiation is complete and a link with said second physical layer is established.

30. The software method of claim 29 further comprising generating a link lost signal when said link is lost.

31. The software method of claim 28 further comprising generating a status signal to notify said first network device of a power status of said first physical layer.

32. A software method for saving energy in a first physical layer of a first network device, comprising:
generating a receive signal using a sense circuit when connection activity that exceeds a first threshold is detected by a receiver;
powering down said first physical layer when said receiver does not detect said connection activity for a first predetermined period to reduce power consumption of said first physical layer;
powering up said first physical layer and attempting to negotiate a connection with a second physical layer of a second network device using an autonegotiation circuit when said sense circuit generates said receive signal;
entering a sense state of said sense circuit;
powering down said first physical layer when said sense circuit is reset,
wherein said sense circuit includes second timer for communicating with a transmitter and that is reset when said receive signal is generated.

33. The software method of claim 32 further comprising turning on said transmitter and generating a pulse when said second timer times out.

34. The software method of claim 33 further comprising turning off said transmitter and transitioning said sense circuit to said sense state after said transmitter generates said pulse.

35. The software method of claim 34 wherein said second timer has a second period that is longer than a period of fast link pulse bursts.

36. A software method for saving energy in a first physical layer of a first network device, comprising:
generating a receive signal using a sense circuit when connection activity that exceeds a first threshold is detected by a receiver; and
powering down said first physical layer when said receiver does not detect said connection activity for a first predetermined period to reduce power consumption of said first physical layer;
powering up said first physical layer and attempting to negotiate a connection with a second physical layer of a second network device using an autonegotiation circuit when said sense circuit generates said receive signal;
sensing an MDI/MDIX connection configuration of said second physical layer; and
adjusting an MDI/MDIX connection configuration of said first physical layer to said MDI/MDIX connection configuration of said second physical layer.

* * * * *

UNITED STATES PATENT AND TRADEMARK OFFICE
CERTIFICATE OF CORRECTION

PATENT NO. : 6,993,667 B1  Page 1 of 1
APPLICATION NO. : 09/990137
DATED : January 31, 2006
INVENTOR(S) : William Lo It is certified that error appears in the above-identified patent and that said Letters Patent is hereby corrected as shown below:

Col. 6 line 36,            Insert --a-- after "includes"

Signed and Sealed this

Twenty-second Day of August, 2006

JON W. DUDAS
*Director of the United States Patent and Trademark Office*